March 16, 1971 P. F. SULLIVAN 3,570,025
SLEEPING AND STORAGE UNIT FOR SMALL SEDANS
Filed July 14, 1969 2 Sheets-Sheet 1

INVENTOR
PAUL F. SULLIVAN

BY *Anthony Castroica*
ATTORNEY

March 16, 1971 P. F. SULLIVAN 3,570,025
SLEEPING AND STORAGE UNIT FOR SMALL SEDANS
Filed July 14, 1969 2 Sheets-Sheet 2
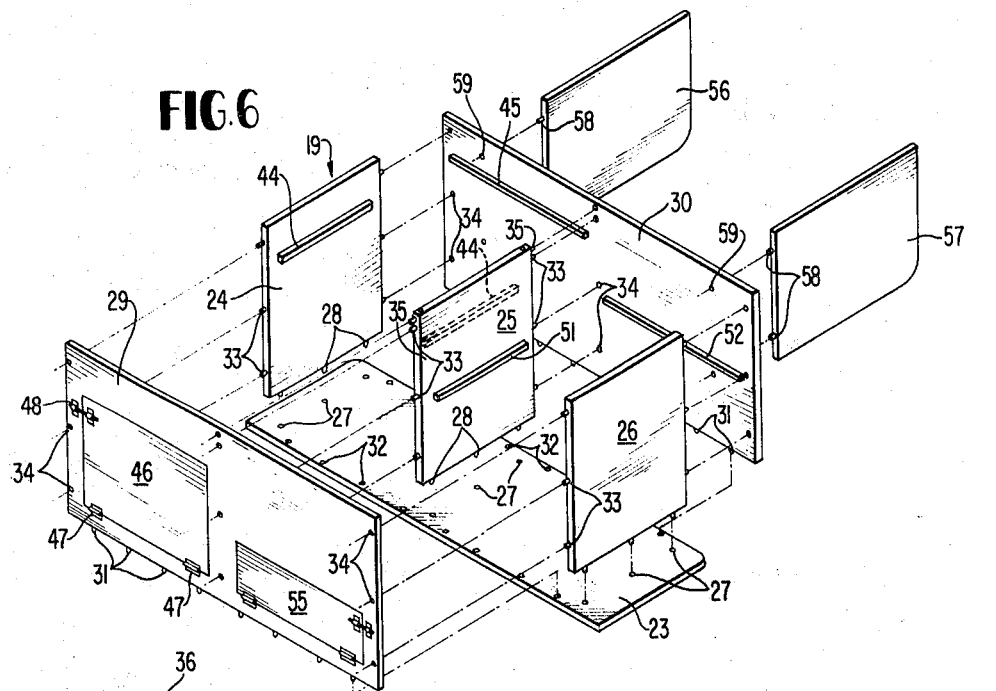
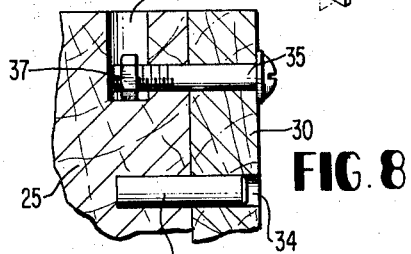
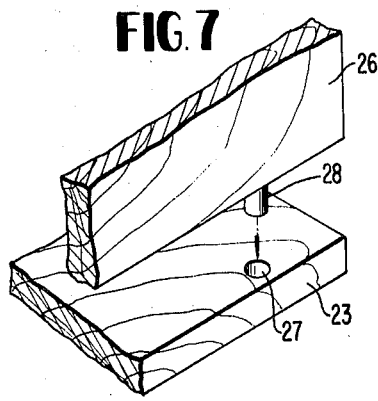
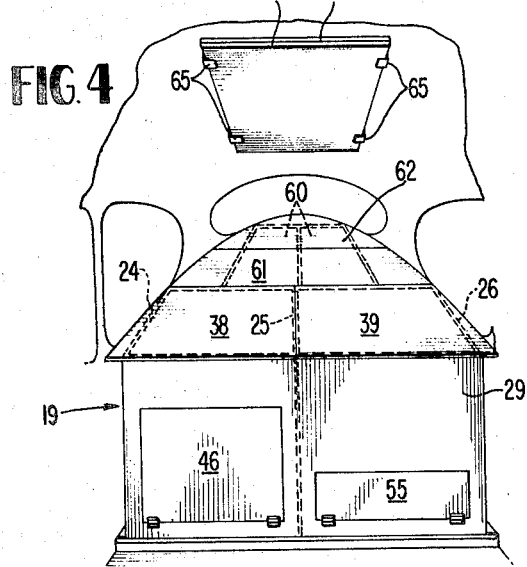
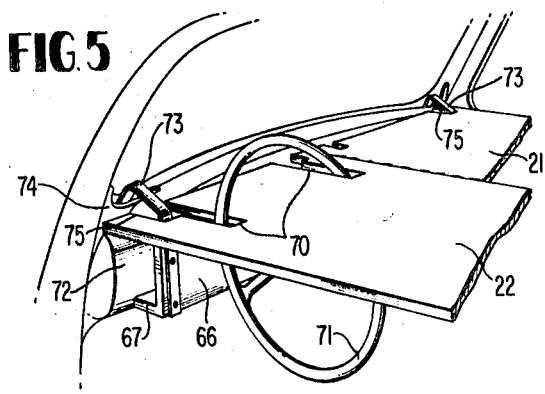

3,570,025
Patented Mar. 16, 1971

3,570,025
SLEEPING AND STORAGE UNIT FOR SMALL SEDANS
Paul F. Sullivan, 16 Sagamore Way,
Waltham, Mass. 02154
Filed July 14, 1969, Ser. No. 841,466
Int. Cl. A47c 17/64
U.S. Cl. 5—118                             10 Claims

ABSTRACT OF THE DISCLOSURE

A sleeping and article storing kit particularly adapted for use in a Volkswagen sedan characterized by relatively few parts which can be assembled or knocked-down in minimum time and providing comfortable sleeping accommodations for two and maximum storage space for a variety of articles in the rear quarters of the vehicle customarily occupied by the rear seat.

---

Sleeping and storage attachments for various vehicles are known in the prior art but notwithstanding this fact a need exists for a more compact, economical and versatile kit for converting a portion of the interior of a sedan into a storage space for various utensils and sleeping quarters for campers and the like. Such a kit must be economical and easy to assemble and disassemble quickly substantially without tools. In general, the prior art devices have suffered from complexity and difficult assembly and disassembly problems, requiring fairly large numbers of fasteners and an excessive number of parts or components. Such problems have tended to render the camper's kits impractical and unpopular.

The aim of this invention is to completely eliminate the enumerated deficiencies of the prior art through the provision of a sleeping and storage kit for campers which is entirely practical, very easy to install and remove, inexpensive and substantially free from numerous screws or like fasteners, the device being supported to a large extent by the body of the automobile into which it fits snugly. While the invention is intended particularly for a Volkswagen sedan, it is in no sense restricted to this car and, with very slight modification, could be installed in almost any make. The storage cabinet portion of the invention is mounted in the area rearwardly of the front seats and requires only the removal of the rear seat which is not difficult or time-consuming. The kit will sleep two people comfortably and includes storage compartments for clothing, toilet articles, dishes, kitchenwares, as well as a small ice box, wash basin and stove. When the kit is knocked-down as for storage during periods of non-use, the parts are flat and compact. The bed-forming panels, while not in use, are conveniently stored beneath the roof or ceiling of the sedan. Other features and advantages of the invention will appear during the course of the following description.

BRIEF DESCRIPTION OF DRAWING FIGURES

FIG. 4 is a fragmentary end elevational view of the invention.

FIG. 5 is a fragmentary perspective view of bed-forming panels and their attachment means at the front of the vehicle.

FIG. 6 is an exploded perspective view showing portions of the invention.

FIG. 7 is an enlarged fragmentary perspective view showing a dowel pin connection between panels.

FIG. 8 is an enlarged vertical cross section showing a typical locking joint employed for safety at two points on the assembly.

DETAILED DESCRIPTION OF PREFERRED EMBODIMENT

Figure 1:
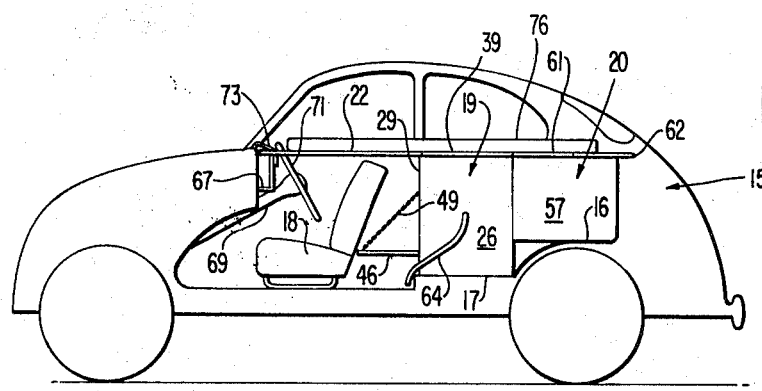
FIG. 1 is a side elevation of the invention sleeping and storage unit installed for use in a sedan.
Figure 2:
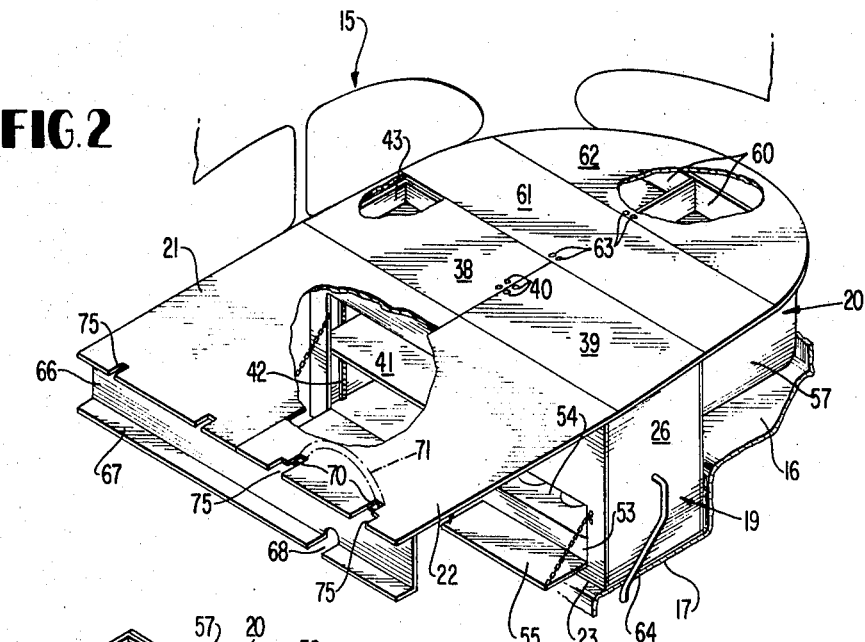
FIG. 2 is a perspective view of the invention, partly broken away.

Referring to the drawings in detail wherein like numerals designate like parts throughout the same, and referring first to FIGS. 1 and 2 there is shown somewhat schematically a small sedan 15, such as the well-known Volkswagen sedan, from which the rear seat has been removed, leaving a rear horizontal ledge 16 and forwardly thereof a stepped-down horizontal floor portion 17, all rearwardly of the front seat compartment 18, as shown. The storge cabinet facilities of the invention, FIGS. 1 and 2, comprise two major components 19 and 20, to be described in full detail, which rest, respectively, on the surfaces 17 and 16. When the device is used as a bed to accommodate two sleepers, the tops of the cabinet components 19 and 20 form the rear section of the bed and forward panels 21 and 22, to be further described, constitute the forward section of the bed.

Proceeding with the description of the invention in fuller detail, the cabinet section 19 comprises a laterally elongated rectangular base panel 23 onto which is mounted three laterally spaced parallel vertical panels or walls 24, 25 and 26. As shown in FIG. 6, the base panel 23 has longitudinal rows of openings 27 to receive dowel pins 28 depending from the lower edges of the vertical panels. The base panel 23 preferably extends for the full width of the car body so that its ends engage the sides of the body and the panel is held rigidly against lateral displacement.

The cabinet section 19 further includes a forward laterally elongated rectangular vertical wall 29 and a rear vertical wall 30 adapted to engage forwardly and rearwardly of the panels 24, 25 and 26 and having depending dowel pins 31 in their lower edges to engage within openings 32 along the front and rear transverse edges of the base panel 23. It may be seen therefore that the elements 23, 24, 25, 26, 29 and 30, when assembled, produce a laterally elongated rectangular box-like structure divided in the middle by the panel 25 and resting upon the floor portion 17 of the sedan. Edge dowel pins 33 in the forward and rear edges of the panels 24, 25 and 26 also engage within properly spaced openings 34 arranged in vertical rows on the walls 29 and 30. As a safety locking feature, at the top of the center vertical panel 25 above the uppermost dowel pins 33, FIG. 8, and at the front and rear edges of the center panel, bolts 35 are employed to secure the panels 25, 29 and 30 in tight assembled relationship. Recesses 36 in the top edge of panel 25 serve to accommodate nuts 37 for the bolts 35, as shown.

The top of the cabinet section 19 is closed by a pair of horizontal rectangular closure or platform sections 38 and 39 which also form parts of the sleeping surface.

Figure 3:
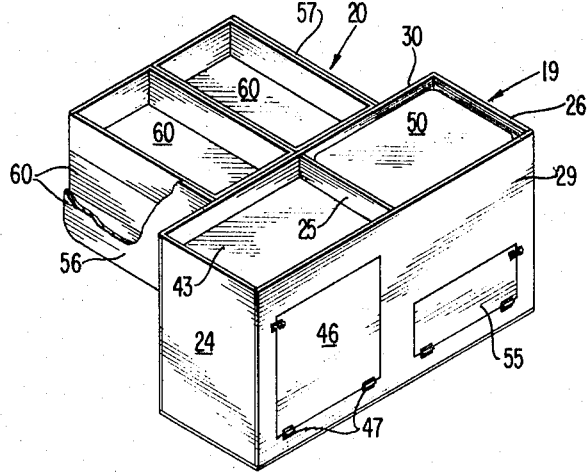
FIG. 3 is a further perspective view of the storage cabinet portion, partly broken away.

These sections 38 and 39 have finger lift openings 40 for added convenience. They rest directly upon the upper edges of the elements 24, 25, 26, 29 and 30 and are readily removable. As shown in FIGS. 2 and 3, the space between the vertical panels 24 and 25 forms a cupboard for various kitchen utensils and is provided with a practical number of adjustable and removable horizontal shelves 41 mounted on conventional shelf brackets 42 shown only in FIG. 2 for simplicity of illustration. Above the shelf or shelves 41, a relatively shallow rectangular tray 43 for silverware and the like rests directly upon support strips 44 on the opposed faces of the panels 24 and 25. A like support strip 45 for the tray may be included on the panel or wall 30, as shown. The silverware tray 43 slips out readily at the top of the cabinet unit. The wall 29 has a large door 46 hinged thereto along its lower edge by hinges 47 to cover the shelved portion of cabinet section 19. The door 46 is located below the tray 43. Bolt means 48 are provided to secure the door 46 in the upright closed position. The door 46 swings forwardly and downwardly to a level position supported by chains 49, FIG. 1, so that it may serve as a small table immediately behind the front seat.

The remainder of the cabinet section 19 on the other side of divider panel 25 receives in its upper portion a small ice box or cooler 50 of conventional construction resting on support ledges 51 and 52 of panels 25, 26 and 30. Below the ice box compartment, another storage compartment 53 is provided in the cabinet section 19 for a small portable stove 54 and/or wash basin and a second vertically swingable door 55 is provided on the wall 29 to cover the compartment 53, see FIG. 2. As shown in FIG. 2, the platform sections 38 and 39 cover the tray 43 and the top of the ice box compartment.

The rearward cabinet section 20 is somewhat simpler and includes a pair of generally rectangular, vertical side walls 56 and 57 having forward dowel pins 58 to coact with mating openings 59 in the previously-described wall 30. The bottoms of the side walls 57 rest directly on the ledge 16 and the rear edges of these walls abut a rear panel of the automobile body so that there will be no displacement rearwardly. Between the side walls 56 and 57, rectangular open top trays 60 for clothing, bedding and the like are simply stacked and one or more of these trays, if desired, may span the entire width between the two side walls 56 and 57. The back panel of the vehicle prevents rearward displacement of the trays and the wall 30 prevents forward displacement while the trays are confined laterally by the side walls 56 and 57. It should now be apparent that one of the salient features of the invention is that the kit is partly self-supporting without fastener elements except for the dowel pins and the two bolts 35, while the body of the car itself confines and lends the major support to the entire knock-down structure.

The top of the rearward cabinet section 20 is covered by a first approximately rectangular laterally elongated platform section 61 and a rearward rounded platform section 62 cut to the contour of the vehicle and fitting snugly therein. These two platform sections have finger lift openings 63, as shown. The ice box 50 is equipped with a suitable drain tube 64. The previously-mentioned forward bed-forming panels or platform sections 21 and 22 are rectangular and while not in use are preferably supported by suitable clips 65 beneath the roof of the vehicle, FIG. 4. When in use, to form a bed surface for two sleepers, FIGS. 1 and 2, the platform sections 21 and 22 have their rear ends resting upon the top edge of vertical wall 29 and their forward edges resting upon a plank 66 having a forwardly projecting flange 67 at its lower edge notched out at 68 to clear the vehicle steering column 69. Platform section 22 is notched in its leading edge as at 70 to receive and clear the steering wheel 71. Other clearance notches may be provided as required. The plank 66 and its horizontal ledge 67 are suspended from opposite corners of the dashboard 72, FIG. 5, by suspension brackets 73 which hook over elements 74 of the vehicle and are secured to the back of the vertical plank 66. Additional slots 75 in the frontal edges of platform sections 21 and 22 receive the suspension brackets 73, as shown in FIG. 5.

The plank 66 is stabilized by the flange or ledge 67 abutting the dashboard 72 and this enables the top edge of the plank 66 to bear the weight of the bed in a stable manner without sagging and lending support to the sections 21 and 22 across their full widths. Similar support is provided at the rear ends of elements 21 and 22 across their full widths. As shown in FIG. 2, the bed surface formed by the elements 21, 22, 38, 39, 61 and 62 is level and continuous. A suitable mattress pad 76, FIG. 1, is placed upon the bed platform and about eighteen inches of clearance remains beneath the roof for the two sleepers whose heads are arranged forwardly in the vehicle.

The parts of the device may be set up or knocked down in a few minutes time without any damage to the vehicle or alteration of the vehicle structure except for the removal of the back seat. No tools are required and the device is essentially self-supporting, as explained, and cannot shift in any direction when properly assembled. Maximum use of the vehicle internal space is taken advantage of. It is thought that the many advantages of the invention over the prior art will now be understood without the need for any further description.

I claim:

1. A sleeping and storage unit for sedans comprising a storage cabinet structure disposed within the back seat area of the sedan and rearwardly of the front seat and having a level top constituting the rear portion of a sleeping surface, said level top spaced substantially below the roof of the sedan, a forward level platform section having a rear edge resting upon the cabinet structure and extending forwardly thereof to a point adjacent the windshield of the sedan and constituting a forward portion of the sleeping surface, a transverse support member underlying the platform section near the forward edge of the latter substantially entirely thereacross and having a flange reacting against the dashboard of the sedan, and suspension elements on the support member and engaging elements of the dashboard near opposite sides of the sedan and supporting said member securely beneath the platform section.

2. The structure of claim 1, and said platform section formed in two separate parts, and one part notched in its forward edge to clear the steering wheel of the sedan and both parts notched to receive said suspension elements.

3. The structure of claim 2, and said suspension elements comprising a pair of end hook-like elements on the support member and said support member and flange being L-shaped and the flange extending forwardly of the support member at its bottom in opposed relation to said hook-like elements.

4. The structure of claim 1, and said storage cabinet structure comprising a forward cabinet section and a rear cabinet section having its bottom somewhat above the bottom of the forward cabinet section, a lateral divider for the forward cabinet section forming two separated compartments therein, and a hinged vertically swingable door on one compartment forming a substantially level table when swung downwardly.

5. The structure of claim 4, and said rear cabinet section having side walls and a top cover panel forming a part of said sleeping surface, and a stack of open top trays for clothing and the like between said side walls and beneath said top cover panel.

6. The structure of claim 5, and said top cover panel for the rear cabinet section formed in two parts with the rearward part rounded to fit the interior contour of the sedan.

7. The structure of claim 1, and said storage cabinet structure including plural readily separable wall portions temporarily secured together in assembled relationship by doweling, said cabinet structure spanning the full width of the sedan and resting on bottom portions thereof whereby the body of the sedan supports the cabinet structure and holds it assembled without the necessity for threaded fasteners or the like.

8. The structure of claim 4, and said forward cabinet section comprising forward and rear vertical walls and a base panel which are laterally elongated and rectangular and span the full width of the sedan, a pair of upright side panels and an intervening upright divider panel on the base panel and between said front and rear walls, all of said panels and walls secured temporarily in assembled relation by dowel pins, and a pair of top cover members for said forward cabinet section and said cover members constituting parts of said sleeping surface.

9. The structure of claim 8, and support elements on at least some of said panels and walls for the support of shelving, trays and a refrigeration box within the front cabinet section.

10. The structure of claim 4, and a second hinged door for the other compartment near the bottom thereof permitting access to a stove or the like therein, and support means for a refrigeration box in said other compartment above said door and stove.

References Cited

UNITED STATES PATENTS

| | | | |
|---|---|---|---|
| 1,375,100 | 4/1921 | Lundstrom | 5—118 |
| 1,459,972 | 6/1923 | Clauson et al. | 5—119 |
| 2,691,783 | 10/1954 | Macaulay | 5—118 |
| 2,867,471 | 1/1959 | Coon, Jr. | 296—23 |
| 3,006,001 | 10/1961 | Llewellyn | 5—118 |
| 3,063,064 | 11/1962 | Mace | 5—94 |
| 3,326,596 | 6/1967 | La Spina | 296—37 |
| 3,436,770 | 4/1969 | Turner | 5—94 |

FRANCIS K. ZUGEL, Primary Examiner

P. A. ASCHENBRENNER, Assistant Examiner